Aug. 10, 1937.  P. T. KEEBLER  2,089,382
EXPANSION TYPE TUBE CLEANER
Filed Oct. 15, 1934
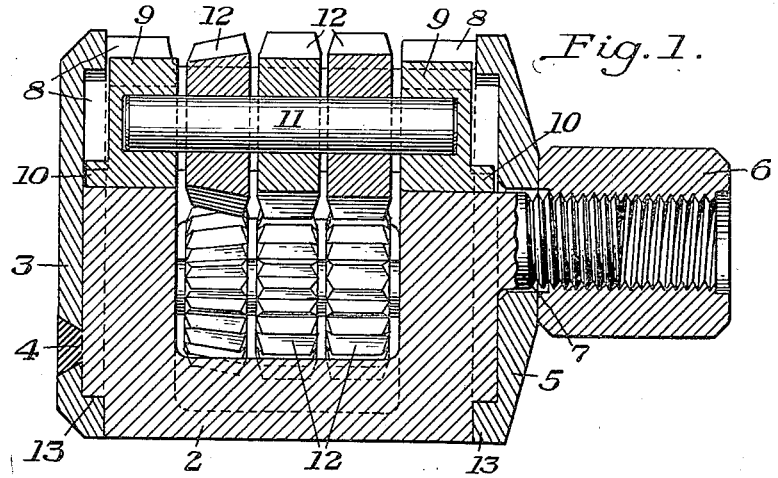
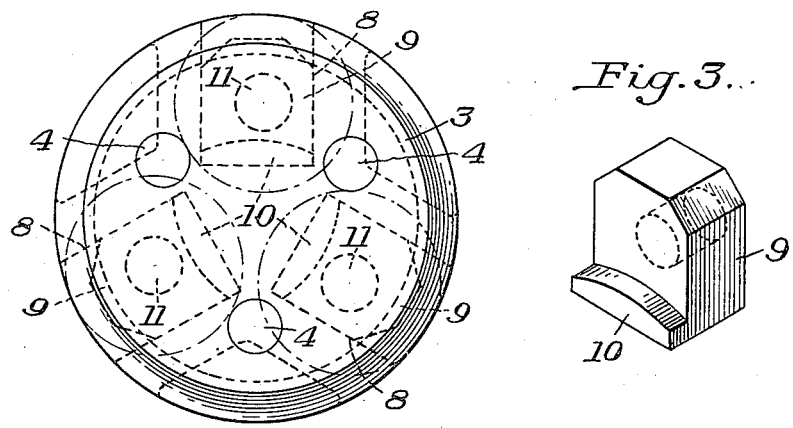
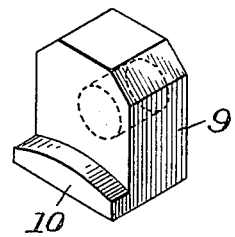
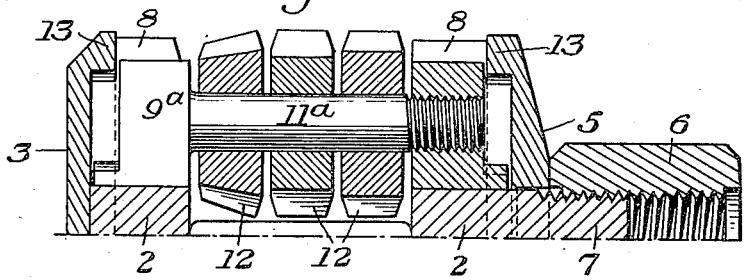
INVENTOR
Paul T. Keebler Patented Aug. 10, 1937

2,089,382

UNITED STATES PATENT OFFICE 2,089,382

EXPANSION TYPE TUBE CLEANER

Paul T. Keebler, Jeannette, Pa., assignor to Elliott Company, Pittsburgh, Pa., a corporation of Pennsylvania Application October 15, 1934, Serial No. 748,298

2 Claims. (Cl. 15—104.13)

Figure 1 is a longitudinal central section showing one form of my improved cleaner head;

Figure 2 is a front elevation of the same;

Figure 3 is a perspective view of one of the holding blocks; and

Figure 4 is a partial longitudinal section showing a modified form.

In tube cleaners having shafts—either rotating or non-rotating—carrying cutters and which move in and out under the high rotation of the head, it has been found desirable to employ limiting holding blocks for such shafts. An example of such construction is shown in my copending application Ser. No. 738,807, filed August 7, 1934, where removable spiders having bearing holes or slots for the shaft are employed.

In such constructions, the in and out throw of the cutters has been limited by the bearing slots in the end plates. Some classes of tubes such as oil still tubes, become worn away on the inside, thus increasing the diameter in portions thereof. This increase in diameter is usually at the ends of the tubes, and it is common practice to install liners or thimbles in the tube ends to prevent further waste.

The cleaner heads must, of course, pass through these thimbles and if, after their insertion, they are operating in a tube having an enlarged diameter due to wear, the type of head ordinarily used has not allowed the cutters to move out far enough to be effective in removing all the scale.

The present invention is designed to overcome this difficulty and provide holding blocks which allow a greater range of in and out movement for the several shafts, thus giving large expansion and greater range of cleaning capacity.

In the drawing, referring to the form of Figures 1, 2 and 3, 2 represents a cage with which cooperates a front head plate 3, which is preferably secured to the arms of the cage by spot welding at the spots marked 4, and a rear removable head plate or follower plate 5, which is held in place by a coupling member 6 screwed onto the cage shaft 7 and arranged to receive the other coupling member for driving from the usual motor. Both heads are provided with annular shoulders or flanges 13 which fit corresponding annular recesses in the ends of the cage. The cage body is provided with three sets of radial recesses 8, one set at each end, each of which receives a holding block 9, shown in Figure 3. This holding block has a rear side extension 10, which is curved to fit the outer face of the recess in the head plate and stop its outward movement; while the entire inner face of each block contacts with the inner end of a recess in the cage, this limiting both inner and outer movements.

As shown in the drawing, the cage 2 comprises spaced-apart front and back head portions which are connected together by substantially-longitudinally-extending peripherally spaced and located integral connecting portions or ribs. This forms a rigid integral cage construction that permits the slide block members to have the necessary desired inward and outward slide movement in the head.

In the form shown in Figures 1, 2 and 3, a shaft 11 enters recessed holes in the blocks which act as bearings, and on this shaft are mounted the cutter wheels 12.

In Figure 4, I show a form similar to that of Figures 1, 2 and 3, except that the shafts 11a are non-rotary. In this case, one end of the shaft is shown as integral with a holding block 9a, while the other end is screwed into another holding block movable within the recess of the other head.

The holding blocks may be arranged to allow an in and out sliding movement of the shafts, whether rotary or non-rotary, or to allow a rocking of the shaft from one end. When the holding blocks become worn, they may be replaced with new ones.

The advantages of the invention result from the greater range of in and out movement with replaceable bearing or holding blocks, thus allowing better cleaning of tubes, particularly those having large internal diameters. Not only is the life of the tube cleaner extended by replacing the holding blocks, but a greater range of operative movements is allowed.

The cage may be changed in form and construction; as many shafts may be used as desired, and the shafts may be mounted in various ways; the movements of the shaft may be rotary or non-rotary; and other changes may be made without departing from my invention.

I claim:

1. A rotary tube cleaner head comprising a pair of longitudinally spaced-apart back and front head portions, at least a pair of substantially longitudinally extending connecting portions located substantially adjacent the periphery of the head and formed integrally with said back and front head portions, outwardly-extending guide recesses in said front and back head portions, bearing blocks in said guide recesses, a substantially longitudinally extending cutter pin in said blocks, a freely mounted cutter element on said pin, said blocks being arranged to permit said pin to freely move outwardly beyond said head under the centrifugal force of rotation and to move inwardly thereof, said blocks having portions adapted to engage the cleaner head and to limit the outward movement of said blocks in said guide recesses, means to maintain said pin in a longitudinal thrust relation with said blocks and to prevent said pin from moving longitudinally beyond said blocks, and a back head follower plate arranged to abut said back head portion and to removably hold said bearing block and cutter pin assembly in an assembled and operative relation in said head.

2. A rotary tube cleaner head comprising spaced-apart front and back head portions connected together by integral connecting portions located adjacent the periphery of said head portions, said connecting portions rigidly holding said front and back head portions together and having a peripherally spaced relationship with respect to each other, outwardly-extending guide recesses in said cleaner head in substantial alignment with the spacing between said connecting portions, bearing blocks in said guide recesses, a substantially longitudinally extending cutter pin mounted in said blocks, a freely mounted cutter element on said pin, said blocks being arranged to permit said pin to move outwardly beyond said head under the centrifugal force of rotation, means to maintain said pin in a longitudinal thrust relation with said blocks and to prevent said pin from moving longitudinally beyond said blocks, a front plate portion rigidly secured to said front head portion and having a substantially annular flange, a back follower plate having a substantially annular flange adapted to be removably positioned with respect to said back head portion and to removably hold said bearing block and cutter pin assembly in an assembled and operative relation in said head, said blocks having portions adapted to engage the cleaner head and said annular flanges of said front and back plates to limit the outward movement of said blocks in said guide recesses.

PAUL T. KEEBLER.